Jan. 27, 1970  T. W. BERWIN ET AL  3,492,602
PULSE WIDTH COUPLER FOR CONVERTING VOLTAGE
FROM ONE LEVEL TO ANOTHER
Filed Dec. 15, 1966

INVENTORS.
TEDDY W. BERWIN,
RICHARD A. YOUNG,
BY

AGENT.

United States Patent Office 3,492,602
Patented Jan. 27, 1970

3,492,602
PULSE WIDTH COUPLER FOR CONVERTING VOLTAGE FROM ONE LEVEL TO ANOTHER
Teddy W. Berwin, Playa Del Rey, and Richard Young, San Jose, Calif., assignors to Hughes Aircraft Company, Culver City, Calif., a corporation of Delaware
Filed Dec. 15, 1966, Ser. No. 601,956
Int. Cl. H03k 7/02
U.S. Cl. 332—9
6 Claims

ABSTRACT OF THE DISCLOSURE

A capacitive input circuit and a resistive input circuit for coupling both high and low frequency video signals of near ground level to high voltage levels. The resistive input includes a pulse width modulator and a restorer circuit whereby the restorer circuit includes a high voltage source for raising the video level to drive the grid of a cathode ray tube or the like.

---

This invention relates to electronic circuitry for coupling electrical signals from one voltage level to a second voltage level and more particularly to a novel and improved electrical coupling circuit which couples signals between D-C levels to video frequencies with accurate response.

The present invention is especially useful, for example, as a grid drive voltage coupling circuit for Z axis control of cathode ray tubes or the like. In such circuits the input level is near ground level and the voltage required on the grid is of a high voltage level, and in some cases it may be about 6 kv.

Heretofore prior art coupling circuits were normally of the R.F. coupling type which required an R.F. modulation system. Although such R.F. modulation systems are simple, require only a small capacitance and no high power supply, there are objections in some respects because of the inherent R.F. radiations that surround such modulation and a greater drive current is necessary since only the positive half cycle is effective.

Capacitive coupling is objectionable, although it too is simple and requires no high voltage power supply, in that a large capacitance is required. As is well known, large capacitance can be destructive to low voltage circuits in case of sudden high voltage discharge. In addition, this type of coupling is undesirable for low-to-high voltage coupling because the input signal must be returned which to zero for references purpose, thus true pulse width coupling may be destroyed.

Other circuits for low level video signal inputs have been found ineffective for input coupling to grids of cathode ray tubes or the like. AC-DC coupling, is objectionable when the choppers used in these circuits are operated at a low frequency since, the capacitances used therewith must be large due to sampling errors. Photo-optical couplings are objectionable in that they provide, in effect, a non-linear DC output and also in that a power supply at high voltages is necessary, especially on the high voltage side to supply power to the photo-conductive elements.

Briefly described, the present invention provides a pulse width coupler which transfers a signal near ground level to a high voltage level and generally for supplying drive voltage to a cathode-ray tube where the grid and cathode thereof are at high voltages and particularly about 6 kv.

A basic circuit for coupling both high-frequency and low frequencies in which both may be found in video signals, for example, comprises a capacitive input for passing high frequencies, and a resistance input for passing low frequencies. The input path which contains the resistive element also contains an integrator, a pulse width modulator, an amplifier and a restorer circuit in series therewith.

The input signal which is to be shifted from a low voltage to a high voltage level travels two separate paths. One path is through the resistive element and the other is through the capacitive element. The capacitive path amplifies the signal while the resistive element pulse width modulates the input signal and the output high level signal is formed at a junction through the resistance and the capacitors, and thus provides the high level voltage required for grid drive of a cathode ray tube or the like.

It therefore becomes one object of this invention to provide a novel and improved pulse width coupler which transfers a signal from one DC level to another.

Another object of this invention is to provide a novel and improved pulse width coupler which has a low power consumption and can pass signals in a complete frequency spectrum without distortion.

Another object of this invention is to provide a pulse width coupler which ranges from DC signals to video frequency signals from near ground level to a high voltage level and exhibit linear transfer characteristics.

These and other objects, features and advantages will become apparent to those skilled in the art when taken into consideration with the following detailed description in which the following drawings illustrate one preferred embodiment thereof and wherein.

Figure 1:
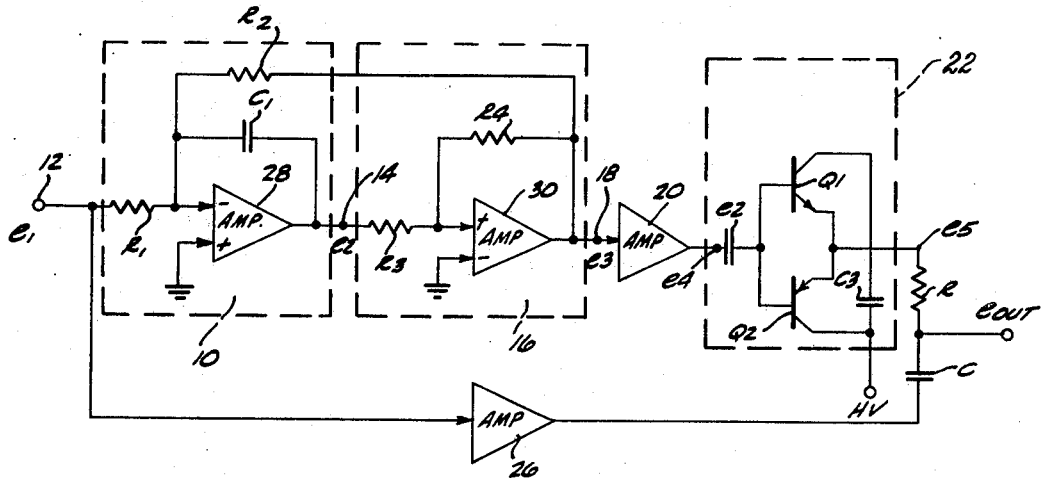
FIGURE 1 illustrates a schematic diagram of one embodiment of this invention.

Turning now to a more detailed description of this invention, there is shown in FIG. 1 a DC circuit for converting the DC components of an input signal $e1$ from a first voltage level to a second voltage level and an AC circuit for converting the AC components of the input signal $e1$ from the first voltage level to the second voltage lever.

The DC circuit includes an integrator 10, a hysteresis circuit 16, an amplifier 20, a restorer circuit 22, and an output resistor R. The integrator 10 and the hysteresis circuit 16 combine to form a pulse width modulator. The AC circuit includes an amplifier 26 and a capacitor C. An input terminal 12 provides a common connection point for the DC circuit and the AC circuit to receive the input signal $e1$. The integrator 10 is coupled to receive the input signal $e1$ from the input terminal 12 and provides an output signal $e2$ at an output terminal 14 in response to the received signal, as illustraed in FIG. 3. The hysteresis circuit receives the signal $e2$ provided by the integrator 10 at the output terminal 14 and provides an output signal $e3$ (illustrated in FIG. 3) at an output terminal 18 that is a pulse train in which the period of the individual pulses is related to the magnitude of the input signal $e1$.

The amplifier 20 receives the pulse train and provides an output signal $e4$ that has the same repetition rate as the signal $e3$ and larger in amplitude. The restorer circuit 22 receives the signal $e4$, and a high voltage signal HV and converts the signal $e4$ to a signal $e5$ having an average value related to the amplitude of the high voltage signal HV and proportional to the DC components of the input signal $e1$.

The amplifier 26 amplifies the input signal $e1$ and applies it to the capacitor C. The output of the capacitor C and the resistor R are coupled together for providing an output signal $e_{out}$ that is the summation of the converted DC components of the input signal $e1$ and the converted AC components of the input signal $e1$.

The integrator 10 and the hysteresis circuit 16 combine to make a pulse width modulator as described above to provide output $e3$ as shown in FIGURE 2, and having a duty cycle representative of the input signal $e1$ applied.

The integrator 10 may be composed of a standard operational amplifier 28 having a capacitor C1 coupled in parallel therewith, resistor R1 coupled in series with the input terminal 12 and the operational amplifier 28 and a feedback resistor R2. The operational amplifier 28 can be a μA702 operational amplifier manufactured by Fairchild Semiconductor Corporation and described in their handbook "Fairchild Semiconductor Linear Integrator Circuits Applications," pages 33 to 56, dated 1967. The integration operation of an operational amplifier of this sort is well known to those skilled in the art and can best be explained by the following:

$$e2 = \frac{-1}{R_1 C_1} \int e_1 dt + \frac{-1}{R_2 C_1} \int e_3 dt \quad \text{(Eq. 1)}$$

Hysteresis circuit 16 opertes as a Schmitt trigger and may be, in some cases, replaced therewith. This embodiment shows an operational amplifier 30 with positive feedback comprising a resistive element R3 coupled in series with the terminal 14 and the operational amplifier 30 and a resistive element R4 coupled in parallel across the operational amplifier 30. In the operation of this hysteresis circuit, the output $e3$ has only two states V0 and —V0, and changes states from V0 to —V0 or vice versa only when the signal $e2$ at terminal 14 is in a state V2 or —V2. V2 is related to V0 by the equation $$V2 = \frac{R3}{R4} V0$$

Figure 3:
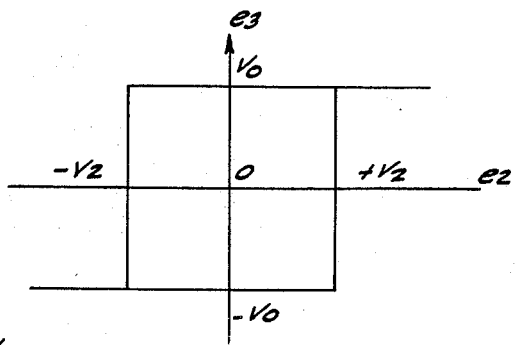
FIGURE 3 is a graphic waveform of signal behaviors from the hysteresis circuit used with the preferred embodiment of this invention.

The characteristic of hysteresis circuit 16 can be described in the graphic diagram as shown in FIGURE 3.

As noted in the diagram of FIGURE 3, $e3$ can only have two values, V0 or —V0. If it is considered at the start that $e3$ equals —V0 and $e2$ is increased slowly at the terminal 14 from integrator 10, from zero V to +V2, $e3$ will change states from —V0 to +V0 when $e2$ reaches +V2. $e3$ will remain at V0 until $e2$ reaches —V2, at which time $e3$ will switch to —V0.

Figure 2:
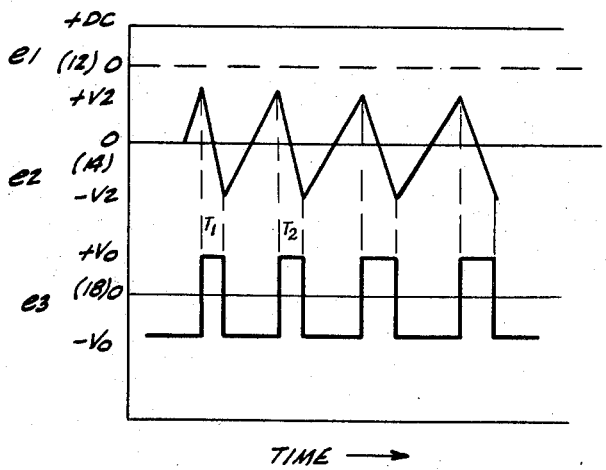
FIGURE 2 is a typical graphic illustration showing the waveforms at various locations on FIGURE 1.

The waveform shown in FIGURE 2 wherein $e1$ represents a positive DC level and $e3$ is a two valued level V0 and —V0. The voltages $e1$ and $e3$ are integrated, as previously stated, and form the waveform $e2$. During the time T1, defined by waveform $e3$, the voltage $e2$ is decreasing at a faster rate than during time T2. T1 is related to $e1$ and $e3$ as shown in Equation 1 and as follows:

$$T2 = 2V2C / \left( \frac{e1}{R1} + \frac{V0}{R2} \right)$$

$$T1 = -2V2C / \left( \frac{e1}{R1} + \frac{V0}{R2} \right)$$

$$\text{Duty cycle} = \frac{T2}{T1+T2} = \frac{1}{2} + e1 \left( \frac{R2}{2V0R1} \right)$$

(Eq. 2)

Thus it can be seen that the duty cycle is linearly related to the input voltage $e1$. The average voltage of $e3$ is proportional to $e1$ which is useful when reconstructing the DC level for the coupling purposes.

The signal $e3$ is amplified to $e4$ by amplifier 20 and applied to the DC restorer circuit 22. This restorer circuit 22 is used to shift the level to the desired high voltage and to apply this high voltage across the coupling resistor R.

The $e4$ input to circuit 22 is the pulse width modulated waveform of fixed amplitude V1. This waveform passes through a capacitor C2 to a complementary pair of transistors Q1 and Q2 which form an emitter follower circuit. Transistor Q1 may be an NPN type transistor and Q2 may be a PNP. The collector of transistor Q1 is connected through a capacitor C3 to a high voltage potential and typically a —6 kv. The collector of transistor Q2 is coupled directly to the high potential. Capacitor C3 is charged through the base-collector diodes of the transistors Q1 and Q2. Through these diodes, the capacitor C3 is charged to V1 and when fully charged supplies the power to operate the transistor Q1 and Q2 in their emitter follower configurations. The waveform $e5$ at the emitter follower output and across the resistor R is the same as $e4$ but at the high voltage DC level. The average voltage of $e5$ is proportional to the DC level of the input analog voltage $e1$ and this average voltage is the DC level restored.

Having thus described one preferred embodiment of this invention, what is claimed is:

1. An electrical circuit for converting an electrical signal from a first voltage level to a second voltage level, comprising:
   an input terminal coupled to receive the electrical signal for providing a common point for the electrical signal of the first voltage level;
   first means coupled to said input terminal for providing a pulse train signal indicative of the first voltage level, individual pulses of the pulse train signal having a period related to the amplitude of the electrical signal; and
   second means coupled to said first means for driving the pulse train signal from the first voltage level to a second voltage level, said second means being coupled to receive the pulse train signal and a voltage of the second voltage level for converting the pulse train signal to an electrical signal of the second voltage level and proportional to the electrical signal.

2. A circuit for converting an electrical signal having DC components and AC components from a first voltage level to a second voltage level, comprising:
   an input means for providing a common point for coupling to the electrical signal;
   a first converting means for converting the DC components of the electrical signal from the first voltage level to the second voltage level;
   a second converting means for converting the AC components of the electrical signal from the first voltage level to the second voltage level, said second means being coupled in parallel circuit relationship with said first means; and
   an output means coupled to receive the DC components of the electrical signal of the second voltage level and the AC components of the electrical signal of the second voltage level for providing an output signal substantially equal to the summation of the received signals.

3. The circuit of claim 2 in which said first means includes:
   a pulse width modulator coupled to receive the electrical signal of the first voltage level for providing a pulse train signal having individual pulses that have a period related to the magnitude of the DC components of the received signal.

4. The circuit of claim 3 in which pulse width modulator includes:
   an integrator coupled to receive the electrical signal for converting the received signal to a linear triangular wave output signal having a period relating to the amplitude of the electrical signal; and
   a hysteresis circuit coupled to receive the linear triangular wave for providing a pulse train signal having a period relating to the period of the linear triangular wave.

5. The circuit of claim 3 in which said first means includes:
   a restorer circuit coupled to receive the pulse train signal and the second voltage level for converting the received pulse train to a signal having a maximum value equal to the value of the received voltage signal.

6. The circuit of claim 4 in which said first means includes:
 a restorer circuit coupled to receive the pulse train signal and the second voltage level for converting the received pulse train to a signal having a maximum value equal to the value of the received voltage signal.

References Cited

UNITED STATES PATENTS

| | | | |
|---|---|---|---|
| 3,328,710 | 6/1967 | Baldwin | 307—313 X |
| 3,384,838 | 5/1968 | Knutrud | 307—265 X |
| 3,191,071 | 6/1965 | King et al. | 307—88.5 |
| 3,213,343 | 10/1965 | Sheheen | 307—88.5 |
| 3,246,247 | 4/1960 | Grindle | 307—88.5 |

OTHER REFERENCES

Steiger—"Frequency Discriminators Using Complementary Transistors"—IEEE Transactions on Circuit Theory, June, 1963, pp. 206—212.

ALFRED L. BRODY, Primary Examiner

U.S. Cl. X.R.

307—265, 255; 325—142; 328—58; 330—11